(12) United States Patent
Tahara et al.

(10) Patent No.: US 11,046,117 B2
(45) Date of Patent: Jun. 29, 2021

(54) TIRE

(71) Applicant: Sumitomo Rubber Industries, Ltd., Kobe (JP)

(72) Inventors: Kotaro Tahara, Kobe (JP); Hiroyuki Ishino, Kobe (JP); Saki Arakawa, Kobe (JP); Kenta Yagi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 251 days.

(21) Appl. No.: 15/954,846

(22) Filed: Apr. 17, 2018

(65) Prior Publication Data

US 2018/0297414 A1   Oct. 18, 2018

(30) Foreign Application Priority Data

Apr. 18, 2017 (JP) ............................. JP2017-082230
Mar. 9, 2018 (JP) ............................. JP2018-042730
(Continued)

(51) Int. Cl.
*B60C 11/03* (2006.01)
*B60C 11/12* (2006.01)

(52) U.S. Cl.
CPC ...... *B60C 11/0302* (2013.01); *B60C 11/1204* (2013.01); *B60C 11/1236* (2013.01);
(Continued)

(58) Field of Classification Search
CPC ......... B60C 11/0304; B60C 2011/0358; B60C 2011/0381
See application file for complete search history.

(56) References Cited

U.S. PATENT DOCUMENTS 5,785,780 A * 7/1998 Ochi ................... B60C 11/0302
152/209.18
2012/0273108 A1* 11/2012 Yoshida .............. B60C 11/0302
152/209.25
(Continued)

FOREIGN PATENT DOCUMENTS

CN          106142998 A      11/2016
DE      102007061148 A1      6/2009
(Continued)

OTHER PUBLICATIONS

Extended European Search Report dated Dec. 18, 2018, in European Patent Application No. 18167608.1.
(Continued)

*Primary Examiner* — Robert C Dye
*Assistant Examiner* — Farah Taufiq
(74) *Attorney, Agent, or Firm* — Birch, Stewart, Kolasch & Birch, LLP

(57) ABSTRACT

A tire comprises a tread portion 2. The tread portion 2 comprises a plurality of oblique grooves 10 extending obliquely from a first tread edge Te1 positioned on one side in a tire axial direction toward a tire equator C, and a plurality of oblique land regions 13 each defined between a pair of the oblique grooves 10 adjacent to each other in a tire circumferential direction. Each of the oblique land regions 13 is provided with a plurality of joint grooves 15 each connecting between the pair of the oblique grooves 10.

16 Claims, 13 Drawing Sheets

(30) Foreign Application Priority Data

Mar. 9, 2018 (JP) .............................. JP2018-042731
Mar. 9, 2018 (JP) .............................. JP2018-042732

(52) U.S. Cl.
CPC .................. *B60C 2011/0369* (2013.01); *B60C 2011/0372* (2013.01); *B60C 2011/0374* (2013.01); *B60C 2011/0379* (2013.01); *B60C 2011/0381* (2013.01); *B60C 2011/1213* (2013.01); *B60C 2200/04* (2013.01)

(56) References Cited

U.S. PATENT DOCUMENTS

| | | | | |
|---|---|---|---|---|
| 2014/0014246 | A1* | 1/2014 | Fujita | B60C 11/0302 152/209.18 |
| 2016/0243899 | A1* | 8/2016 | Miyoshi | B60C 11/12 |
| 2016/0288580 | A1* | 10/2016 | Higashiura | B60C 11/0306 |
| 2017/0120684 | A1 | 5/2017 | Katayama et al. | |
| 2019/0023080 | A1* | 1/2019 | Yamakawa | B60C 11/0309 |

FOREIGN PATENT DOCUMENTS

| | | | |
|---|---|---|---|
| EP | 0 721 853 A1 | 7/1996 | |
| EP | 1533140 A1 * | 5/2005 | .............. B60C 11/11 |
| EP | 2823973 A1 | 1/2015 | |
| EP | 3 075 572 A1 | 10/2016 | |
| EP | 3 078 506 A1 | 10/2016 | |
| JP | 2002-248909 A | 9/2002 | |
| JP | 2003-080907 A | 3/2003 | |
| JP | 2014-80112 A | 5/2014 | |
| JP | 2016-000578 A | 1/2016 | |
| JP | 2016-196288 A | 11/2016 | |
| WO | WO 2014/115052 A1 | 7/2014 | |

OTHER PUBLICATIONS

Partial European Search Report, dated Sep. 26, 2018, for European Application No. 18167608.1.

* cited by examiner

TIRE

TECHNICAL FIELD

The present invention relates to a winter tire, and in particular, to a tire suitable for running on a snowy road surface.

BACKGROUND ART

Japanese Unexamined Patent Application Publication No. 2016-196288 (Patent Literature 1) proposes a winter tire having a tread portion provided with a plurality of oblique lateral grooves, inner joint grooves, and center joint grooves. The oblique lateral grooves each extend obliquely from outside one of ground contact edges toward a tire equator to have an inner end positioned near the tire equator. Each of the inner joint grooves extends so as to connect between a pair of the oblique lateral grooves adjacent to each other in a tire circumferential direction on a side of the tire equator. The center joint grooves are arranged on an inner side in a tire axial direction of the inner joint grooves and each cross the tire equator.

However, the tire disclosed in Patent Literature 1 has room for further improvement with regard to traction during running on a snowy road surface.

SUMMARY OF THE INVENTION

The present invention was made in view of the above, and a primary object thereof is to provide a tire capable of improving the traction during running on a snowy road surface.

In one aspect of the present invention, a tire comprises a plurality of oblique grooves extending obliquely from a first tread edge positioned on one side in a tire axial direction toward a tire equator, a plurality of oblique land regions each defined between a pair of the oblique grooves adjacent to each other in a tire circumferential direction, wherein each of the oblique land regions is provided with a plurality of joint grooves each connecting between the pair of the oblique grooves.

In another aspect of the invention, it is preferred that the joint grooves include an inner joint groove arranged closest to the tire equator, and at least one middle joint groove arranged adjacently to the inner joint groove on a side of the first tread edge, and the middle joint groove has a smaller angle than that of the inner joint groove with respect to the tire circumferential direction.

In another aspect of the invention, it is preferred that each of the oblique grooves is curved such that an angle thereof with respect to the tire axial direction gradually increases toward the tire equator.

In another aspect of the invention, it is preferred that the joint grooves include an outer joint groove arranged closest to the first tread edge in addition to the middle joint groove, and the middle joint groove has a smaller angle than that of the inner joint groove with respect to the tire circumferential direction.

In another aspect of the invention, it is preferred that the outer joint groove has a smaller angle than that of the inner joint groove with respect to the tire circumferential direction.

In another aspect of the invention, it is preferred that two middle joint grooves are provided between the inner joint groove and the outer joint groove.

In another aspect of the invention, it is preferred that the middle joint groove and the outer joint groove are inclined in a direction opposite to the oblique grooves.

In another aspect of the invention, it is preferred that an outer lateral groove is provided between the outer joint groove and the first tread edge, and the outer lateral groove extends from one of the pair of the oblique grooves and terminates within the oblique land region.

In another aspect of the invention, it is preferred that the plurality of the oblique grooves terminate between the tire equator and the first tread edge, the tread portion is provided with a plurality of center lateral grooves each crossing the tire equator so as to connect between a pair of the oblique grooves adjacent to each other in the tire axial direction, and the center lateral grooves have larger groove widths than the joint grooves.

In another aspect of the invention, it is preferred that the plurality of the joint grooves include an inner joint groove arranged closest to the tire equator, and each of the center lateral grooves has a larger groove width over an entire length thereof than a maximum groove width of the inner joint groove.

In another aspect of the invention, it is preferred that an angle of the inner joint groove with respect to the tire axial direction is smaller than an angle of each of the center lateral grooves with respect to the tire axial direction.

In another aspect of the invention, it is preferred that a difference between the angle of each of the center lateral grooves with respect to the tire axial direction and the angle of the inner joint groove with respect to the tire axial direction is not more than 20 degrees.

In another aspect of the invention, it is preferred that the plurality of the oblique grooves terminate between the tire equator and the first tread edge, the tread portion is provided with a plurality of center lateral grooves each crossing the tire equator so as to connect between a pair of the oblique grooves adjacent to each other in the tire axial direction, and at least one of the joint grooves is connected with one of the center lateral grooves with one of the oblique grooves therebetween.

In another aspect of the invention, it is preferred that the center lateral grooves extend straight.

In another aspect of the invention, it is preferred that the center joint grooves have greater lengths in the tire axial direction than the joint grooves.

In another aspect of the invention, it is preferred that the plurality of the joint grooves include a middle joint groove arranged between the tire equator and the first tread edge, and the middle joint groove has at least one bent portion.

In another aspect of the invention, it is preferred that the middle joint groove has two bent portions that are convex in opposite directions to each other.

In another aspect of the invention, it is preferred that the middle joint groove has a pair of main oblique portions inclined in the same direction and a sub oblique portion forming the bent portions therebetween.

In another aspect of the invention, it is preferred that the sub oblique portion and the main oblique portions are inclined in the opposite direction to each other.

In another aspect of the invention, it is preferred that an angle of the sub oblique portion with respect to the tire circumferential direction is larger than angles of the main oblique portions with respect to the tire circumferential direction.

DESCRIPTION OF THE PREFERRED EMBODIMENT

An embodiment of the present invention will now be described in conjunction with accompanying drawings.

Figure 1:
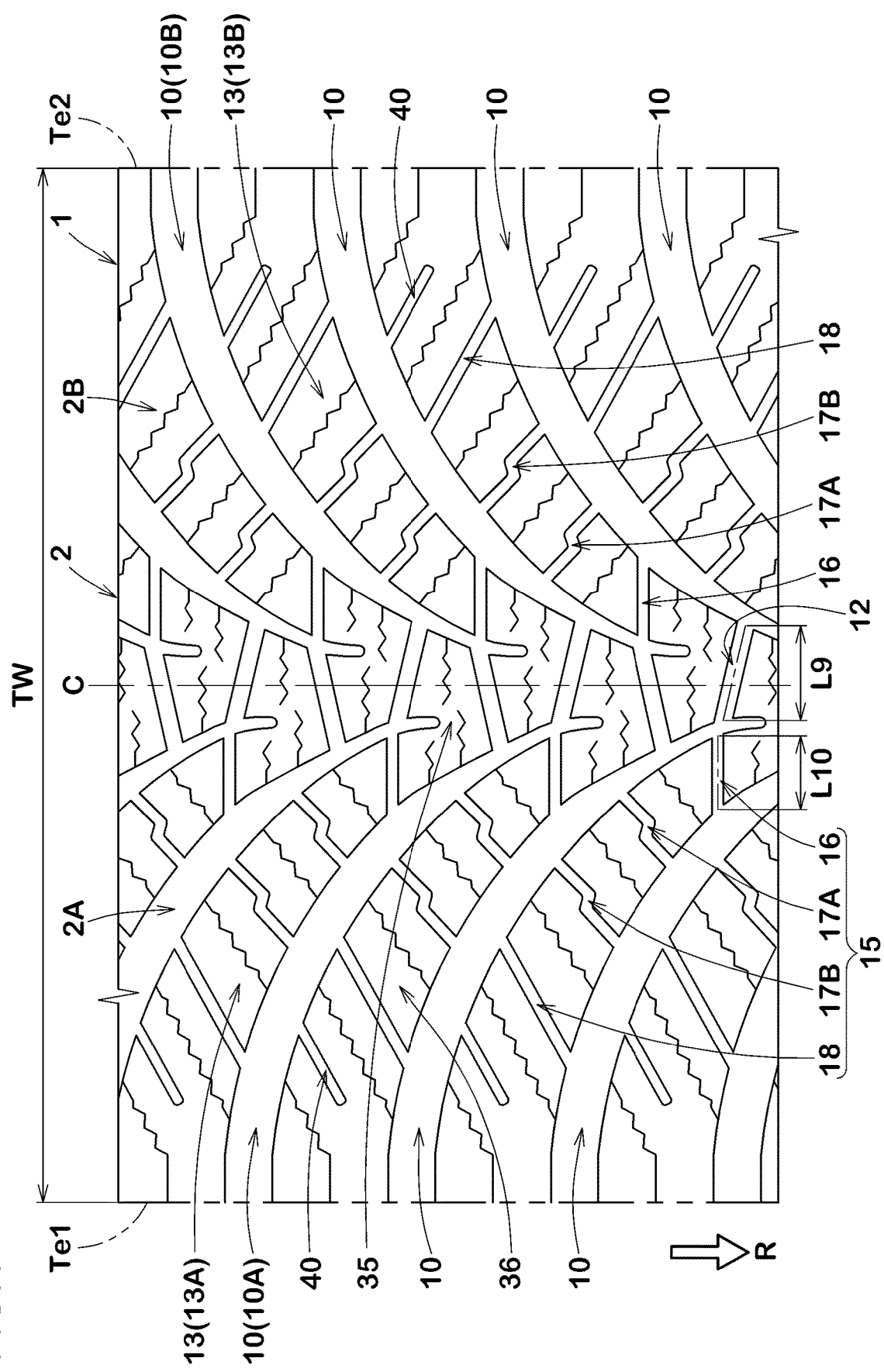
FIG. 1 is a development view of a tread portion of a tire according to one embodiment of the present invention.

FIG. 1 is a development view of a tread portion 2 of a tire 1 in this embodiment. As shown in FIG. 1, the tire 1 in this embodiment is suitably used as a pneumatic tire for winter for a passenger car, for example. In another embodiment of the present invention, the tire 1 can be used as a pneumatic tire for heavy load, a non-pneumatic tire not filled with pressurized air therein, or the like, for example.

The tire 1 in this embodiment has a directional pattern bound with an intended tire rotational direction R, for example. The tire rotational direction R is indicated on a sidewall portion (not shown) with characters or symbols, for example.

The tire 1 in this embodiment has the tread portion 2 arranged between a first tread edge Te1 and a second tread edge Te2. The tread portion 2 includes a first tread portion 2A arranged between a tire equator C and the first tread edge Te1 and a second tread portion 2B arranged between the tire equator C and the second tread edge Te2. The first tread portion 2A and the second tread portion 2B are substantially line symmetrical except that they are displaced with each other in the tire circumferential direction. Thereby, each configuration of the first tread portion 2A can be applied to the second tread portion 2B.

In a case of a pneumatic tire, the first tread edge Te1 and the second tread edge Te2 are defined as outermost ground contacting positions in the tire axial direction of the tire 1 when the tire 1 in a standard state is in contact with a flat surface with zero camber angle by being loaded with a standard tire load. The standard state is a state in which the tire is mounted on a standard rim, inflated to a standard pressure, and loaded with no tire load. In this specification, dimensions and the like of various parts of the tire are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with a plurality of oblique grooves 10. The oblique grooves 10 include first oblique grooves 10A provided in the first tread portion 2A and second oblique grooves 10B provided in the second tread portion 2B, for example. The first oblique grooves 10A extend obliquely from the first tread edge Te1 toward the tire equator C. The second oblique grooves 10B extend obliquely from the second tread edge Te2 toward the tire equator C. Each of the second oblique grooves 10B has substantially the same configuration as each of the first oblique grooves 10A. Thereby, the configuration of the first oblique grooves 10A can be applied to the second oblique grooves 10B, unless otherwise noted. Each of the oblique grooves 10 forms a long snow block extending obliquely with respect to the tire axial direction and then shears the snow block during running on a snowy road surface, therefore, it is possible that large traction on a snowy road surface can be obtained.

In a preferred embodiment, each of the oblique grooves 10A and 10B is inclined to a heel-side in the tire rotational direction R from the tread edge Te1 or Te2 toward the tire equator C. However, the present invention is not limited to such an embodiment.

Figure 2:
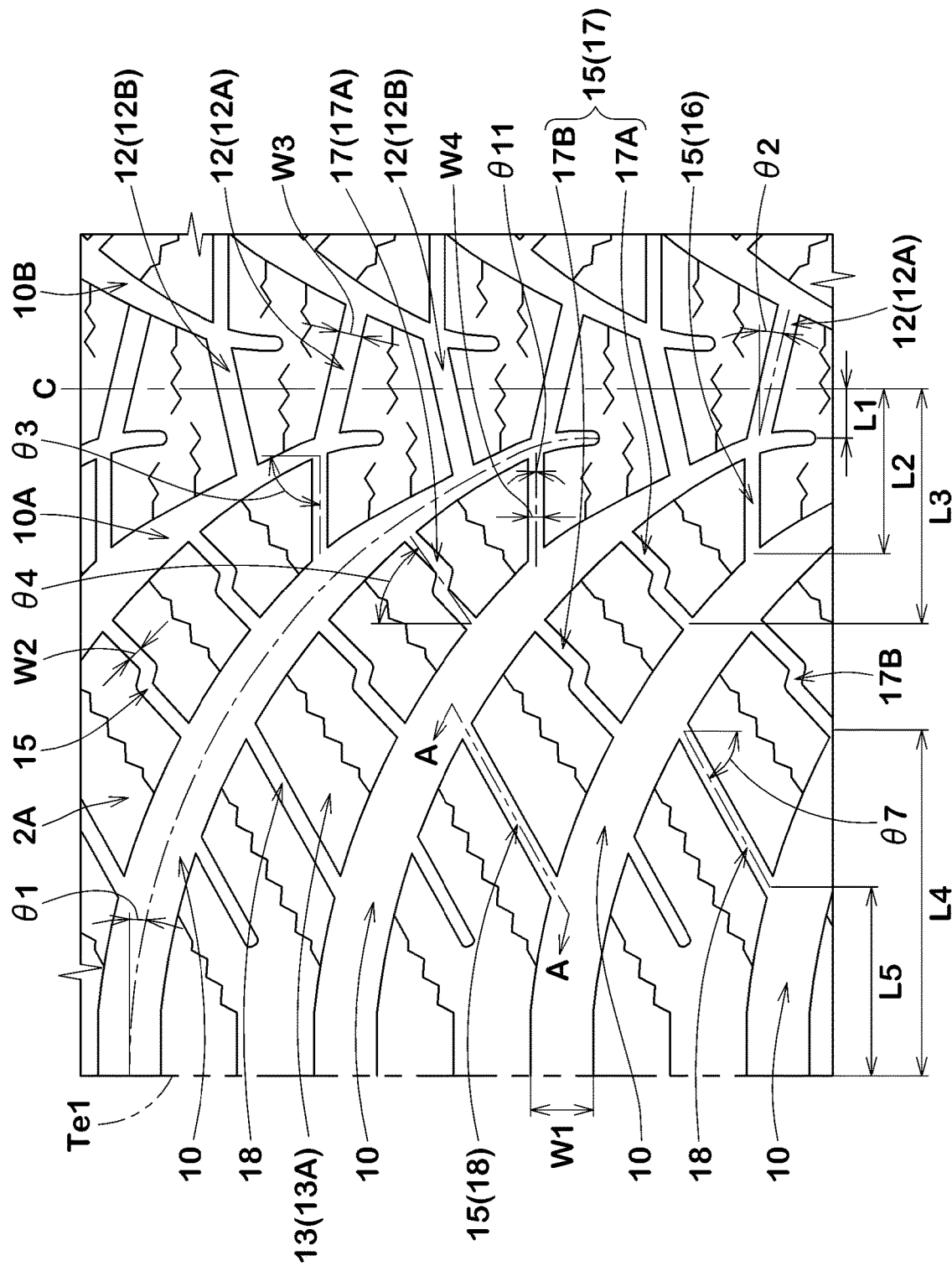
FIG. 2 is an enlarged view of a first tread portion.

FIG. 2 is an enlarged view of the first tread portion 2A. As shown in FIG. 2, it is preferred that each of the oblique grooves 10 is curved such that an angle θ1 with respect to the tire axial direction gradually increases toward the tire equator C, for example. It is preferred that the angle θ1 is in a range of from 0 to 80 degrees, for example. The oblique grooves 10 configured as such can exert snow shearing force in the tire axial direction as well during running on a snowy road surface.

The oblique grooves 10 terminate without crossing the tire equator C.
Thereby, the first oblique grooves 10A terminate between the tire equator C and the first tread edge Te.
The second oblique grooves 10B terminate between the tire equator C and the second tread edge Te2.
In a more preferred embodiment, each of the oblique grooves 10 has an inner end portion on a side of the tire equator C terminating without being connected with other grooves.
The oblique grooves 10 configured as such maintain rigidity in the vicinity of the tire equator C, therefore, they are useful for improving steering stability on a dry road surface.

It is preferred that a length L1 in the tire axial direction between an inner end of each of the oblique grooves 10 (meaning an end on an inner side in the tire axial direction of a groove center line thereof, the same applies hereinafter.) and the tire equator is in a range of from 2.0% to 7.0% of a tread width TW, for example. The tread width TW is a distance in the tire axial direction of the tire in the standard state between the first tread edge Te1 and the second tread edge Te2.

It is preferred that a groove width of each of the oblique grooves 10 gradually increases axially outwardly from a side of the tire equator C, for example. It is preferred that a maximum groove width W1 of each of the oblique grooves 10 is in a range of from 3.0% to 5.0% of the tread width TW, for example. In a case of a winter tire for a passenger car, a depth of each of the oblique grooves 10 is in a range of from 6.0 to 12.0 mm, preferably in a range of from 8.0 to 9.0 mm, for example.

The tread portion 2 in this embodiment is provided with a plurality of center lateral grooves 12. Each of the center lateral grooves 12 crosses the tire equator C so as to connect between one of the first oblique grooves 10A and one of the second oblique grooves 10B. More specifically, the center lateral grooves 12 include first center lateral grooves 12A and second center lateral grooves 12B.

Each of the first center lateral grooves 12A branches off from one of the first oblique grooves 10A and extends in the tire axial direction so as to be connected with one of the second oblique grooves 10B. The first center lateral grooves 12A are inclined in the same direction as the first oblique grooves 10A. More specifically, each of the first center lateral grooves 12A is inclined in the same direction with respect to the tire axial direction between the first end connected with one of the first oblique grooves 10A and a second end thereof connected with one of the second oblique grooves 10B.

Each of the second center lateral grooves 12B branches off from one of the second oblique grooves 10B and extends in the tire axial direction so as to be connected with one of the first oblique grooves 10A. The second center lateral grooves 12B are inclined in the same direction as the second oblique grooves 10B (shown in FIG. 1). More specifically, each of the second center lateral grooves 12B is inclined in the same direction with respect to the tire axial direction between the first end connected with one of the second oblique grooves 10B and the second end connected with one of the first oblique grooves 10A.

The first center lateral grooves 12A and the second center lateral grooves 12B are arranged alternately in the tire circumferential direction. With such arrangement of the center lateral grooves 12, snow shearing force in multiple directions can be obtained, therefore, excellent on-ice/on-snow performance is exerted.

The tread portion 2 is provided with oblique land regions 13. Each of the oblique land regions 13 is defined between a pair of oblique grooves 10 adjacent to each other in the tire circumferential direction. The oblique land regions 13 in this embodiment include a region defined between one of the first center lateral grooves 12A and its adjacent one of the second center lateral grooves 12B, for example.

As shown in FIG. 1, the oblique land regions 13 include first oblique land regions 13A each defined between a pair of the first oblique grooves 10A adjacent to each other and second oblique land regions 13B each defined between a pair of the second oblique grooves 10B adjacent to each other, for example. Each of the second oblique land regions 13B has substantially the same configuration as each of the first oblique land regions 13A. Thereby, the configuration of the first oblique land regions 13A can be applied to the second oblique land regions 13B unless noted otherwise.

As shown in FIG. 2, the oblique land regions 13 are provided with a plurality of joint grooves 15 each connecting between a pair of the oblique grooves 10 adjacent to each other in the tire circumferential direction. A plurality of the joint grooves 15 configured as such form a plurality of snow blocks during running on a snowy road surface, therefore, it is possible to generate large snow traction. The joint grooves 15 include inner joint grooves 16 arranged closest to the tire equator C, middle joint grooves 17 arranged closer to the first tread edge Te1 than the inner joint grooves 16, and outer joint grooves 18 arranged closest to the first tread edge Te1.

It is preferred that the center lateral groove 12 and the inner joint groove 16 are connected with the oblique groove 10 at the same position, for example. Thereby, at least one of the joint grooves, the inner joint groove 16 in this embodiment, is connected with the first center lateral groove 12A with the first inclined groove 10A therebetween. Further, an end portion of the inner joint groove 16 and an end portion of the center lateral groove 12 are opposed to each other with the groove center line of the oblique groove 10 therebetween. Note that "one of the grooves is connected with the other one of the grooves via the oblique groove" includes an embodiment in which a first imaginary region obtained by virtually extending the one of the grooves in a longitudinal direction thereof overlaps at least a part of an end portion of the other one of the grooves and a second imaginary region obtained by virtually extending the other one of the grooves in a longitudinal direction thereof overlaps at least a part of an end portion of the one of the grooves. In a preferred embodiment, either one or both of the first imaginary region and the second imaginary region overlap the end portions in approximately 50% of the groove width thereof. In this embodiment, a virtually extended region of the center lateral groove 12 overlaps the entire end portion of the inner joint groove 16, whereas a virtually extended region of the inner joint groove 16 overlaps the end portion of the center lateral groove 12 in approximately 50% of the groove width thereof.

The inner joint grooves 16 configured as such are connected with the center lateral grooves 12 to which large ground contact pressure is applied, therefore, it is possible to form horizontally elongated hard snow blocks, thereby, it is possible to improve the traction during running on a snowy road surface.

It is preferred that each of the center lateral grooves 12 has a groove width larger than that of each of the joint grooves 15, for example. In this embodiment, a groove width W3 of each of the center lateral grooves 12 is larger than the groove width of each of the inner joint grooves 16, the middle joint grooves 17, and the outer joint grooves 18. The center lateral grooves 12 configured as such form large and hard snow blocks in the vicinity of the tire equator C to which high ground contact pressure is applied during running on an icy/snowy road surface, therefore, it is possible to provide large snow shearing force. On the other hand, the oblique land regions 13 are provided with the joint grooves 15 having relatively small groove widths, thus the oblique land regions prevent decrease in rigidity in the vicinity of the joint grooves 15, therefore, excessive deformation during cornering on a dry road surface is suppressed, thereby, it is possible that the steering stability on a dry road surface is improved.

Each of the center lateral grooves 12 in this embodiment has a constant groove width over the entire length thereof, for example. Further, it is preferred that each of the center lateral grooves 12 has the groove width W3 larger than a maximum groove width W4 of each of the inner joint grooves 16 over the entire length thereof. In a more preferred embodiment, each of the center lateral grooves 12 has the groove width larger than any of the plurality of the joint grooves 15. Thereby, the above-described effects are surely exerted.

The groove width W3 of each of the center lateral grooves 12 is preferably not less than 1.30 times, more preferably not less than 1.40 times the maximum groove width W4 of each of the inner joint grooves 16, and preferably not more than 1.70 times, more preferably not more than 1.60 times the maximum groove width W4 of each of the inner joint grooves 16, for example. The center lateral grooves 12 configured as such are useful for improving the on-ice/on-snow performance and the steering stability on a dry road surface in a good balance.

The groove width W3 of each of the center lateral grooves 12 in this embodiment is larger than a groove width of the inner end portion of each of the oblique grooves 10, for example. Further, the groove width W3 of each of the center lateral grooves 12 is smaller than the maximum groove width W1 of each of the oblique grooves 10, for example. The center lateral grooves 12 configured as such can improve the on-ice/on-snow performance while suppressing uneven wear in the vicinity of the tire equator c.

Each of the first center lateral grooves 12A and the second center lateral grooves 12B in this embodiment has the groove width described above. In a further preferred embodiment, each of the first center lateral grooves 12A and the second center lateral grooves 12B has the same groove width. Such arrangement of the center lateral grooves 12 is useful for further suppressing the uneven wear in the vicinity of the tire equator C.

Each of the center lateral grooves 12 extends straight between the first end and the second end thereof, for example. However, the center lateral grooves 12 are not limited to such an embodiment. It is preferred that each of the plurality of the center lateral grooves 12 is inclined at an angle θ2 in a range of from 5 to 25 degrees with respect to the tire axial direction, for example. With the center lateral grooves 12 configured as such, large on-snow traction can be expected.

As shown in FIG. 1, it is preferred that each of the center lateral grooves 12 has a length in the tire axial direction larger than that of each of the inner joint grooves 16, for example. It is preferred that a length L9 of each of the center lateral grooves 12 in the tire axial direction is in a range of from 1.20 to 1.40 times a length L10 of each of the inner joint groove 16 in the tire axial direction, for example. The center lateral grooves 12 configured as such can increase the on-snow traction while suppressing the uneven wear of the land regions in the vicinity of the tire equator C.

As shown in FIG. 2, the inner joint grooves 16 are arranged on a side of the tire equator C of a center position (not shown) of the first tread portion 2A in the tire axial direction, for example. It is preferred that a distance L2 in this embodiment between an outer end in the tire axial direction of each of the inner joint grooves 16 (meaning an end on an outer side in the tire axial direction of a groove center line thereof, the same applies hereinafter.) and the tire equator C is in a range of from 0.10 to 0.14 times the tread width TW, for example.

The inner joint grooves 16 extend straight, for example. Each of the inner joint grooves 16 is arranged at an angle θ3 in a range of from 80 to 90 degrees with respect to the tire circumferential direction, for example. The inner joint grooves 16 configured as such are useful for increase the on-snow traction. Note that in a case that the inner joint grooves 16 are inclined with respect to the tire axial direction, it is preferred that the inner joint grooves 16 are inclined in the direction opposite to the oblique grooves 10.

It is preferred that an angle θ11 of each of the inner joint grooves 16 with respect to the tire axial direction is smaller than the angle θ2 of each of the center lateral grooves 12 with respect to the tire axial direction, for example. It is preferred that a difference between the angle θ2 of each of the center lateral grooves 12 with respect to the tire axial direction and the angle θ11 of each of the inner joint grooves 16 with respect to the tire axial direction is not more than 20 degrees, for example. The inner joint grooves 16 configured as such can increase the on-snow traction together with the center lateral grooves 12.

One or a plurality of the middle joint grooves 17 are provided, for example. In each of the oblique land regions 13 in this embodiment, two middle joint grooves 17 are provided between the inner joint groove 16 and the outer joint groove 18. The middle joint grooves 17 include first middle joint grooves 17A arranged on a side of the tire equator C and second middle joint grooves 17B arranged on a side of the first tread edge Te1. It is preferred that each of the middle joint grooves 17 is inclined in the opposite direction to the oblique groove 10 with which the middle joint groove 17 is connected, for example.

It is preferred that each of the first middle joint grooves 17A and the second middle joint grooves 17B is arranged on a side of the tire equator C of the center position in the tire axial direction of the first tread portion 2A, for example. It is preferred that a distance L3 between the tire equator C and an outer end in the tire axial direction of each of the first middle joint grooves 17A in this embodiment is in a range of from 0.14 to 0.18 times the tread width TW, for example. It is preferred that a distance L4 between the first tread edge Te1 and an outer end in the axial direction of each of the second middle joint grooves 17B is in a range of from 0.20 to 0.30 times the tread width TW, for example. During running on an icy/snowy road surface, relatively large ground contact pressure is applied to the first middle joint grooves 17A and the second middle joint grooves 17B in this embodiment, therefore, it is possible that hard snow blocks are formed.

The middle joint grooves 17 are formed so that an angle θ4 of each of the middle joint grooves 17 is smaller than that of each of the inner joint grooves 16 with respect to the tire circumferential direction. The angle θ4 is an angle with respect to the tire circumferential direction of a virtual straight line obtained by connecting both ends of a groove center line of each of the middle joint grooves 17. It is preferred that the angle θ4 of each of the middle joint grooves 17 is in a range of from 30 to 50 degrees, for example.

During straight running on a snowy road surface, large ground contact pressure is applied to the inner joint grooves 16 arranged closest to the tire equator C, therefore, it contributes greatly to the on-snow traction. Therefore, by making the angles of the inner joint grooves 16 relatively large with respect to the tire circumferential direction, the inner joint grooves 16 form hard snow blocks together with the oblique grooves 10, thereby, it is possible to further improve the on-snow traction.

It is preferred that each of the end portions of the middle joint grooves 17 in this embodiment is displaced from the end portion of the middle joint groove 17 provided in the oblique land region 13 adjacent thereto in the tire circumferential direction. In other words, it is preferred that a plurality of three-way paths is formed by the middle joint grooves 17 and the oblique grooves 10. The middle joint grooves 17 configured as such suppress decrease in rigidity of the tread portion 2, therefore, they are useful for improving the steering stability on a dry road surface.

Figure 3:
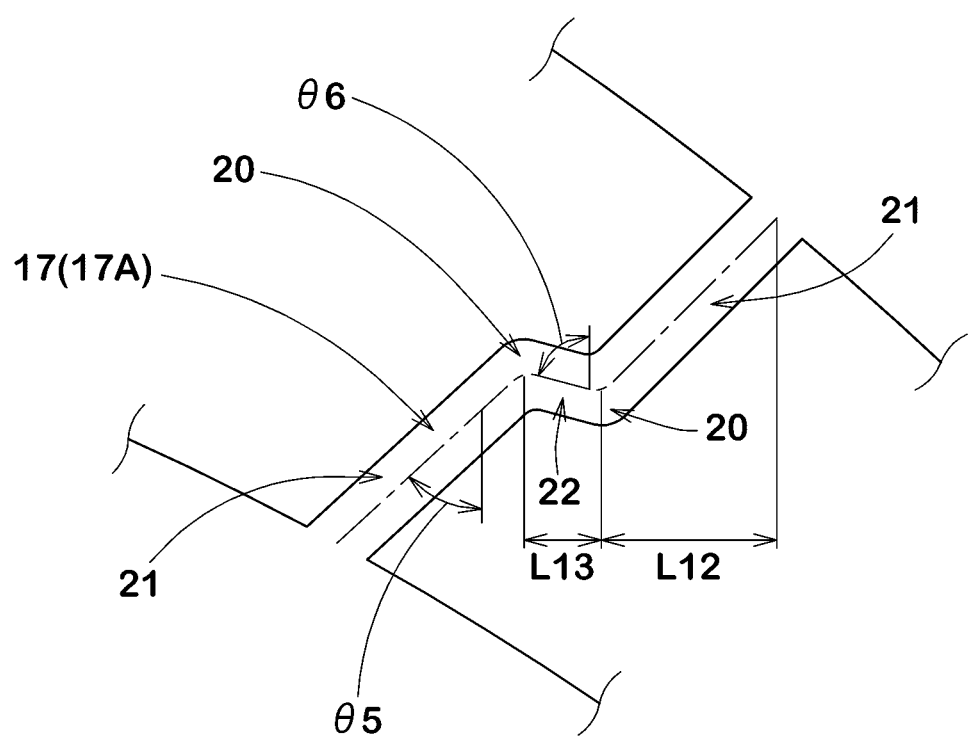
FIG. 3 is an enlarged view of a contour of a first middle joint groove.

FIG. 3 is an enlarged view of a contour of one of the first middle joint grooves 17A for explaining the middle joint grooves 17. As shown in FIG. 3, each of the middle joint grooves 17 in this embodiment has at least one bent portion 20. In a more preferred embodiment, each of the middle joint grooves 17 has two bent portions 20 that are convex in opposite directions to each other, for example. The middle joint grooves 17 configured as such form hard snow blocks by the bent portions 20 during running on a snowy road surface, therefore, it is possible to generate large on-snow traction.

Further, each of the middle joint grooves 17 including the bent portions 20 is likely to be deformed to be twisted in accordance with a change in the ground contact pressure applied to the oblique grooves 10 arranged on both sides of the middle joint groove 17, therefore, it is possible to effectively discharge snow in the groove, thereby, it is possible to exert the effects described above over a long period of time.

Each of the middle joint grooves 17 has a pair of main oblique portions 21 and a sub oblique portion 22 forming the bent portions 20 therebetween, for example. Each of the main oblique portions 21 extends from one of the oblique grooves 10 at an angle θ5 in a range of from 45 to 55 degrees with respect to the tire circumferential direction, for example.

The sub oblique portion 22 is inclined in the same direction as the oblique groove 10 with which the middle joint groove 17 is connected, for example. Further, the sub oblique portion 22 in this embodiment is inclined in a direction opposite to those of the main oblique portions 21, for example. However, the sub oblique portion 22 is not limited to such an embodiment, and it may be inclined in the same direction as the main oblique portions 21 as long as the bent portion 20 can be formed.

It is preferred that an angle θ6 of the sub oblique portion 22 with respect to the tire circumferential direction is larger than the angle θ5 of each of the main oblique portions 21, for example. Specifically, it is preferred that the angle θ6 of the sub oblique portion 22 is in a range of from 65 to 85 degrees, for example. The sub oblique portions 22 configured as such are useful for increasing the on-snow traction.

It is preferred that the sub oblique portion 22 has a smaller length than those of the main oblique portions 21, for example. It is preferred that a length L13 of the sub oblique portion 22 in the tire axial direction is in a range of from 0.30 to 0.50 times a length L12 of each of the main oblique portions 21 in the tire axial direction.

As shown in FIG. 2, the outer joint groove 18 are arranged on a side of the first tread edge Te1 of the center position in the tire axial direction of the first tread portion 2A, for example. It is preferred that a distance L5 between the first tread edge Te1 and an outer end in the tire axial direction of each of the outer joint grooves 18 is in a range of from 0.10 to 0.20 times the tread width TW, for example.

The outer joint grooves 18 extend straight, for example. It is preferred that the outer joint grooves 18 are inclined in a direction opposite to the oblique grooves 10, for example. In other words, the outer joint grooves 18 are inclined in the same direction as the middle joint grooves 17. It is preferred that an angle θ7 of each of the outer joint grooves 18 with respect to the tire circumferential direction is larger than that of each of the middle joint grooves 17, for example. More specifically, the angle θ7 of each of the outer joint grooves 18 is at least larger than the angle θ5 (shown in FIG. 3) of each of the main oblique portions 21 of the middle joint grooves 17. In a preferred embodiment, the angle θ7 of each of the outer joint grooves 18 is larger than the angle θ4 of the virtual straight line obtained by connecting the both ends of the groove center line of each of the middle joint grooves 17. Therefore, blocks divided by the outer joint grooves 18 are likely to deform appropriately in the tire circumferential direction. Thereby, during running on an icy/snowy road surface, snow in the oblique grooves 10 is further compacted, therefore, it is possible to obtain excellent on-ice/on-snow performance.

In order to exert the effects described above while maintaining the steering stability on a dry road surface, in a more preferred embodiment, the angle of each of the outer joint grooves 18 with respect to the tire circumferential direction is smaller than that of each of the inner joint groove 16. It is preferred that the angle θ7 of each of the outer joint grooves 18 is in a range of from 60 to 70 degrees, for example.

It is preferred that each of the joint grooves 16 to 18 described above has a groove width W2 in a range of from 0.20 to 0.30 times the maximum groove width W1 of each of the oblique grooves 10, for example. The joint grooves 16 to 18 configured as such can improve the steering stability on a dry road surface and the on-ice/on-snow performance in a good balance.

Figure 4:
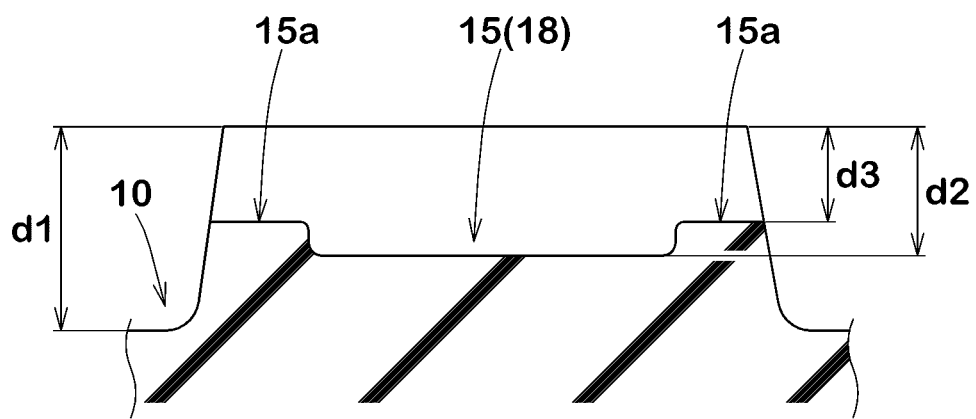
FIG. 4 is a cross-sectional view taken along A-A line of FIG. 2.

FIG. 4 is a cross-sectional view of one of the outer joint grooves 18 taken along A-A line of FIG. 2 as a diagram showing a sectional shape of the joint groove 15. As shown in FIG. 4, it is preferred that each of the joint grooves 15 has a maximum depth d2 in a range of from 0.55 to 0.70 times a depth d1 of each of the oblique grooves 10, for example.

In a preferred embodiment, it is preferred that a bottom surface of each of the joint grooves 15 is raised at end portions 15a on both sides in the tire axial direction. It is preferred that a depth d3 of each of the end portions 15a is in a range of from 0.65 to 0.80 times the maximum depth d2 of the joint groove 15, for example. The joint grooves 15 configured as such can further improve the steering stability on a dry road surface.

Figure 5:
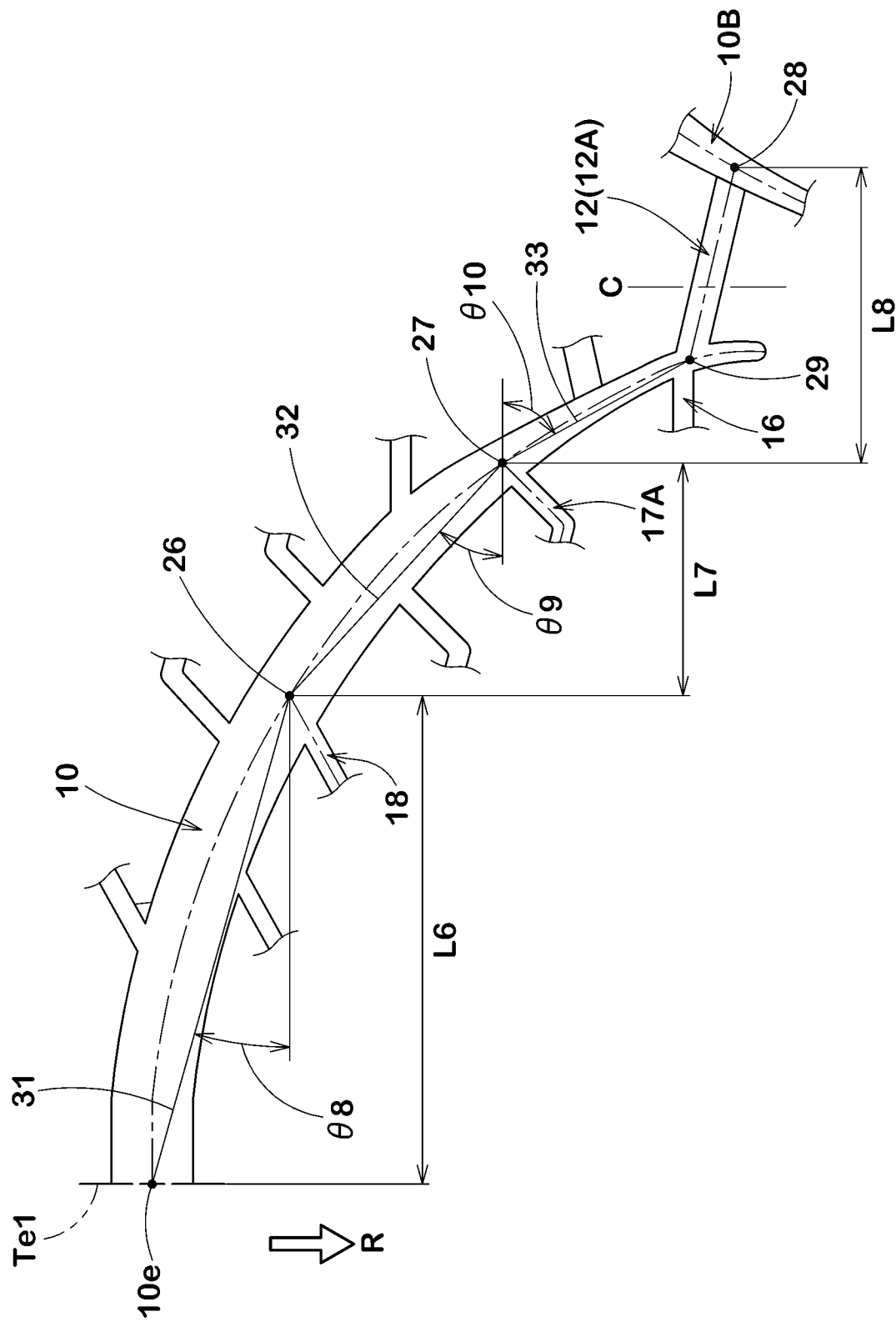
FIG. 5 is an enlarged view of contours of an oblique groove, a center lateral groove, and joint grooves.

A more detailed configuration of each of the grooves will now be described. FIG. 5 is an enlarged view of contours of one of the oblique grooves 10, one of the center lateral grooves 12, and the joint grooves 15. As shown in FIG. 5, an intersection point between the groove center line of the oblique groove 10 and an extended line of a groove center line of the outer joint groove 18 connected with the oblique groove 10 on the heel side in the tire rotational direction R is defined as a first intersection point 26. In order to improve the steering stability on a dry road surface and the on-ice/on-snow performance in a good balance, it is preferred that a first distance L6 in the tire axial direction between the first tread edge Te1 and the first intersection point 26 is in a range of from 0.24 to 0.30 times the tread width TW, for example.

An intersection point of the groove center line of the oblique groove 10 and an extended line of a groove center line of the first middle joint groove 17A connected with the oblique groove 10 on the heel side in the tire rotational direction R is defined as a second intersection point 27. It is preferred that a second distance L7 in the tire axial direction between the first intersection point 26 and the second intersection point 27 is in a range of from 0.10 to 0.17 times the tread width TW, for example.

An intersection point of an extended line of a groove center line of the first center lateral groove 12A and a groove center line of the second oblique groove 10B is defined as a third intersection point 28. It is preferred that a third distance L8 in the tire axial direction between the second intersection point 27 and the third intersection point 28 is in a range of from 0.12 to 0.19 times the tread width TW, for example.

It is preferred that a first straight line 31 extending between the first intersection point 26 and an intersection point 10e of the first tread edge Te1 and the groove center line of the oblique groove 10 is inclined at an angle θ8 in a range of from 5 to 25 degrees with respect to the tire axial direction. Thereby, the oblique grooves 10 can form snow blocks elongated in the tire axial direction especially in the vicinity of the first tread edge Te1, therefore, it is possible that large on-snow traction is obtained.

It is preferred that a second straight line 32 extending between the second intersection point 27 and the third intersection point 28 is inclined at an angle θ9 in a range of from 32 to 52 degrees with respect to the tire axial direction, for example.

An intersection point of the groove center line of the oblique groove 10 and an extended line of a groove center line of the center lateral groove 12 connected with the oblique grooves 10 on a side closest to the tire equator C is defined as a fourth intersection point 29. It is preferred that a third straight line 33 extending between the second intersection point 27 and the fourth intersection point 29 is inclined at an angle θ10 in a range of from 51 to 71 degrees with respect to the tire axial direction, for example.

Figure 6:
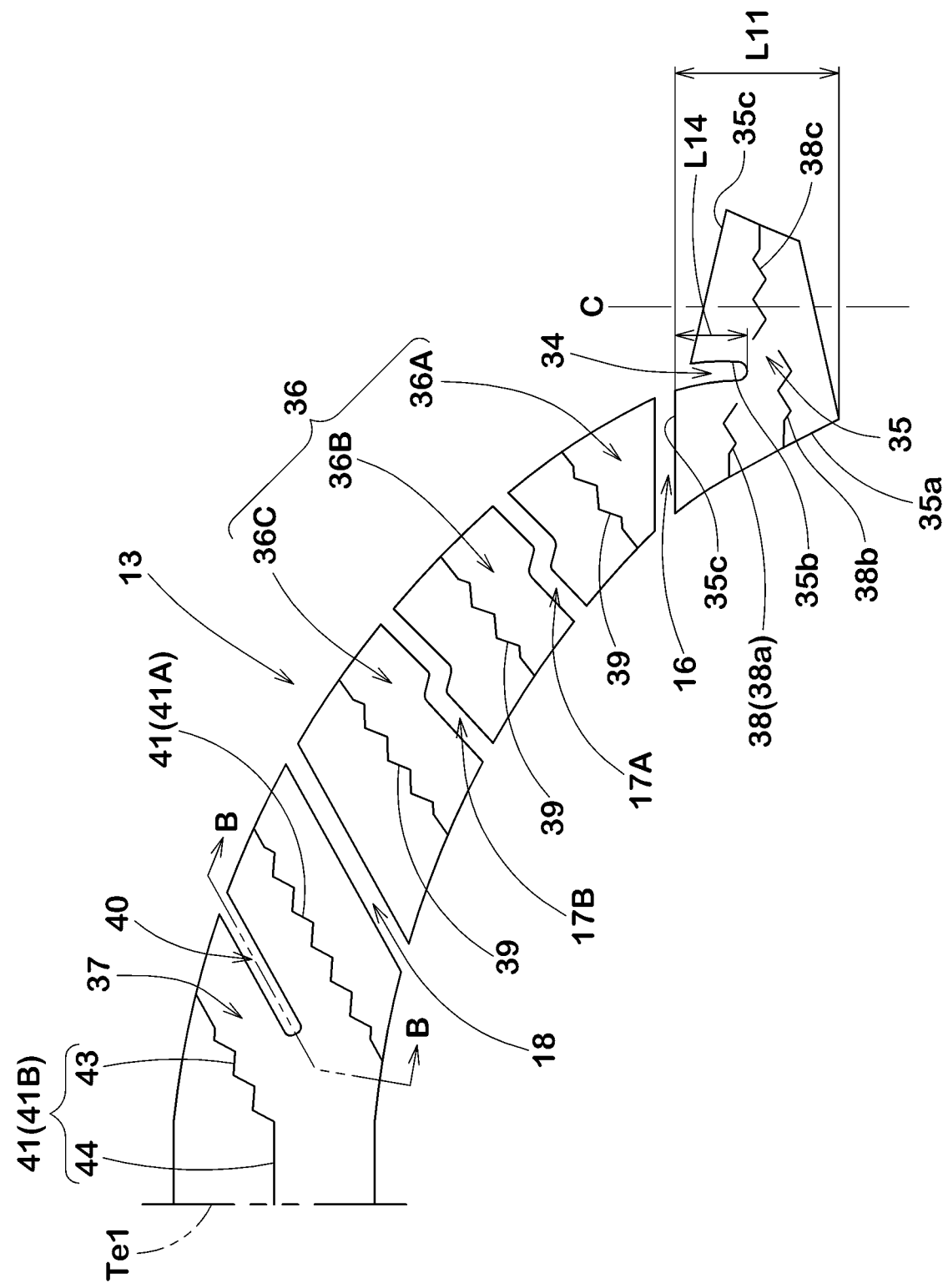
FIG. 6 is an enlarged view of an oblique land region.

FIG. 6 is an enlarged view of one of the oblique land regions 13. As shown in FIG. 6, each of the oblique land regions 13 includes a crown block 35, a plurality of middle blocks 36, and a shoulder block 37, for example.

The crown block 35 includes a region defined by the inner joint groove 16 and the oblique grooves 10 on both sides and a region defined between the first center lateral groove 12A and the second center lateral groove 12B, for example. The crown block 35 in this embodiment has a ground contacting surface surrounded by a first edge 35a, a second edge 35b, and a third edge 35c. The first edge 35a is convex toward the heel side in the tire rotational direction R, for example. The second edge 35b is arranged on a toe side in the tire rotational direction R of the first edge 35a, and is concave toward the heel side, for example. The third edge 35c connects between the first edge 35a and the second edge 35b. Thereby, the crown block 35 has a substantially u-shaped ground contacting surface.

The crown block 35 is provided with a concave portion 34 concave from a side wall thereof on the toe side in the tire rotational direction R toward the heel side in the tire rotational direction R. The concave portion 34 is formed by a tip portion of the oblique groove 10 described above. It is preferred that a length L14 of the concave portion 34 in the tire circumferential direction is in a range of from 0.30 to 0.50 times a length L11 of the crown block 35 in the tire circumferential direction, for example.

It is preferred that the crown block 35 is provided with at least one crown lateral sipe 38, for example. The crown lateral sipe 38 has one end connected with one of the grooves and the other end terminating within the block, for example. The crown lateral sipe 38 extends in the tire axial direction, for example. The crown lateral sipe 38 configured as such can provide frictional force on a road surface covered with firmly compacted snow, for example, while maintaining rigidity of the crown block 35. Note that, in this specification, the term "sipe" means a cut or a groove having a width not more than 1.5 mm.

The crown block 35 in this embodiment is provided with a first crown lateral sipe 38a, a second crown lateral sipe 38b, and a third crown lateral sipe 38c, for example. The first crown lateral sipe 38a extends from the first oblique groove 10A toward the second tread edge Te2 and terminates before reaching the concave portion 34, for example.

The second crown lateral sipe 38b extends from the first oblique groove 10A toward the second tread edge Te2 and has a length in the tire axial direction larger than that of the first crown lateral sipe 38a, for example. The second crown lateral sipe 38b in this embodiment terminates at a position closer to the second tread edge Te2 than the concave portion 34, for example. The third crown lateral sipe 38c extends from the second oblique groove 10B toward the first tread edge Te1, crosses the tire equator C, and terminates before reaching the concave portion 34. The crown block 35 having the crown lateral sipes 38 configured as such can suppress clogging of snow in each of the oblique grooves 10 in the vicinity of the tire equator C while maintaining the steering stability on a dry road surface.

In each of the oblique land regions 13, the middle blocks 36 includes a first middle block 36A, a second middle block 36B, and a third middle block 36C, for example. The first middle block 36A is defined between the inner joint groove 16 and the first middle joint groove 17A, for example. The second middle block 36B is defined between the first middle joint groove 17A and the second middle joint groove 17B, for example. The third middle block 36C is defined between the second middle joint groove 17B and the outer joint groove 18, for example.

It is preferred that each of the middle blocks 36 is provided with a middle sipe 39 completely crossing the block, for example. Each of the middle sipes 39 in this embodiment is inclined in the same direction as the middle joint grooves 17, for example.

The shoulder block 37 is defined between the outer joint groove 18 and the first tread edge Te1, for example.
The shoulder block 37 is provided with an outer lateral groove 40 and a plurality of shoulder sipes 41 are provided, for example.

The outer lateral groove 40 extends from one of the adjacent oblique grooves 10 and terminates within the oblique land region 13, for example. The outer lateral groove 40 configured as such can improve the on-ice/on-snow performance while maintaining rigidity of the shoulder block 37.

The outer lateral groove 40 extend straight and obliquely in the same direction as the outer joint groove 18, for example. The outer lateral groove 40 in this embodiment extends along the outer joint groove 18, for example. The outer lateral groove 40 configured as such makes rigidity distribution of the shoulder block 37 uniform, therefore, it is useful for maintaining the steering stability on a dry road surface.

It is preferred that the outer lateral groove 40 overlaps the outer joint groove 18 in the tire axial direction, for example. Thereby, the on-snow traction is further increased.

Figure 7:
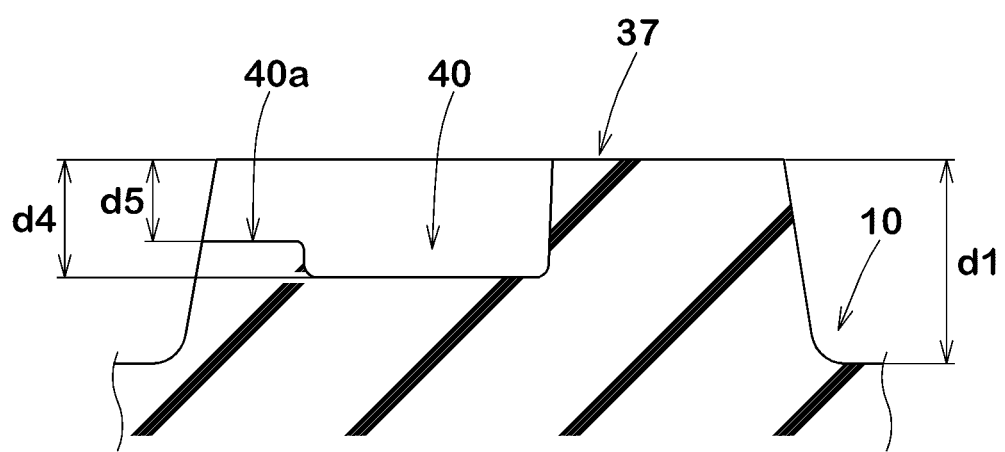
FIG. 7 is a cross-sectional view taken along B-B line of FIG. 6.

FIG. 7 is a cross-sectional view of one of the outer lateral grooves 40 taken along B-B line of FIG. 6. As shown in FIG. 7, each of the outer lateral grooves 40 has a maximum depth d4 in a range of from 0.50 to 0.65 times the depth d1 of each of the oblique grooves 10, for example.

It is preferred that a bottom surface of the outer lateral groove 40 is raised at an end portion 40a connected with the oblique groove 10, for example. It is preferred that a depth d5 of the end portion 40a is in a range of from 0.65 to 0.75 times the maximum depth d4, for example. The outer lateral grooves 40 configured as such maintain the rigidity of the shoulder blocks 37, therefore, it is possible to improve the steering stability on a dry road surface.

As shown in FIG. 6, in each of the shoulder blocks 37, the shoulder sipes 41 include a first shoulder sipe 41A and a second shoulder sipe 41B, for example. The first shoulder sipe 41A is arranged between the outer joint groove 18 and the outer lateral groove 40 and completely crosses the block, for example. The first shoulder sipe 41A is inclined in the same direction as the outer joint groove 18 and extends along the outer joint groove 18 in this embodiment, for example.

The second shoulder sipe 41B has one end connected with the oblique groove 10 and the other end extending to the first tread edge Te1, for example. The second shoulder sipes 41B configured as such moderately decrease the rigidity of the shoulder blocks 37, therefore, it is possible to improve wandering performance.

It is preferred that the second shoulder sipe 41B includes an oblique sipe portion 43 and a lateral sipe portion 44, for example. The oblique sipe portion 43 extends obliquely from one of the oblique grooves 10 adjacent thereto, for example. The oblique sipe portion 43 is inclined in the same direction as the outer lateral groove 40 and extends along the outer lateral groove 40 in this embodiment, for example. It is preferred that the oblique sipe portion 43 extends in a zigzag manner, for example. Sipe walls of the oblique sipe portion 43 are engaged with each other during running, therefore, it is possible that the oblique sipe portion 43 maintains apparent rigidity of the shoulder block 37.

The lateral sipe portion 44 is connected with the oblique sipe portion 43 on an axially outer side thereof and extends to the first tread edge Te1 along the tire axial direction. The lateral sipe portion 44 extends straight, for example. In each of the second shoulder sipes 41B, the lateral sipe portion 44 allows shearing deformation of the shoulder block 37 in the tire axial direction even when the sipe walls thereof are in contact with each other. Thereby, snow is easily discharged from the oblique grooves 10 during running on an icy/snowy road surface.

In this embodiment, it is preferred that the sipes provided in each of the blocks are formed in a zigzag manner except for the lateral sipe portions 44 of the second shoulder sipes 41B. The sipes configured as such maintain the apparent rigidity of each of the blocks, therefore, it is possible that the steering stability on a dry road surface is improved.

As shown in FIG. 1, a land ratio Lr of the tread portion 2 in this embodiment is preferably not less than 60%, more preferably not less than 65%, and preferably not more than 80%, more preferably not more than 75%. Thereby, the steering stability on a dry road surface and the on-ice/on-snow performance are improved in a good balance. In this specification, the term "land ratio" means a ratio Sb/Sa of a total area Sa of an imaginary ground contacting surface obtained by filling all the grooves and the sipes and an actual total area Sb of the ground contacting surface.

From the same point of view, rubber hardness Ht of tread rubber forming the tread portion 2 is preferably not less than 45 degrees, more preferably not less than 55 degrees, and preferably not more than 70 degrees, more preferably not more than 65 degrees. In this specification, the term "rubber hardness" means hardness measured by a type-A durometer according to Japanese Industrial standard JIS-K 6253 under an environment of 23 degrees Celsius.

Figure 8:
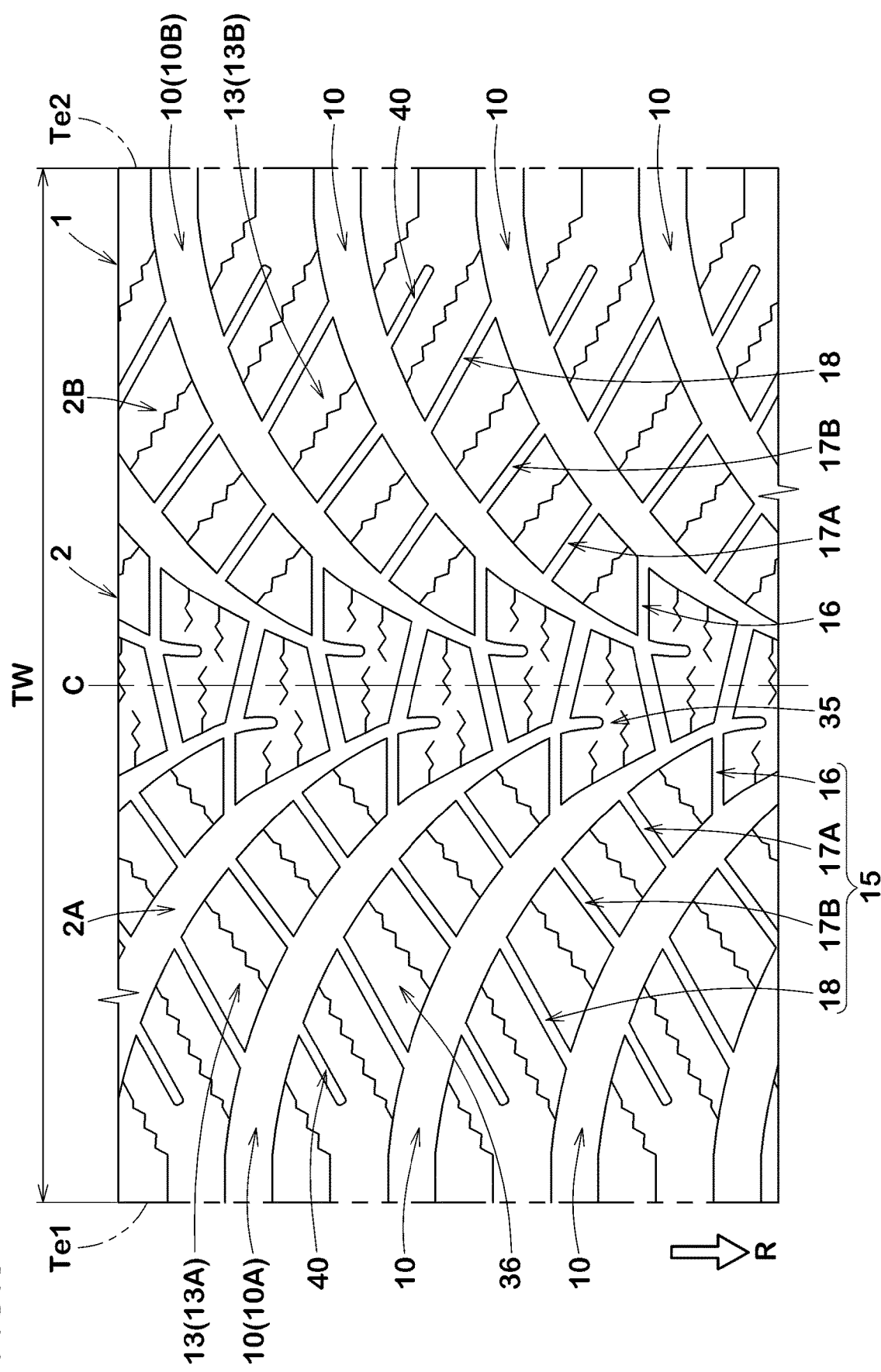
FIG. 8 is a development view of the tread portion of a tire according to second embodiment of the present invention.
Figure 9:
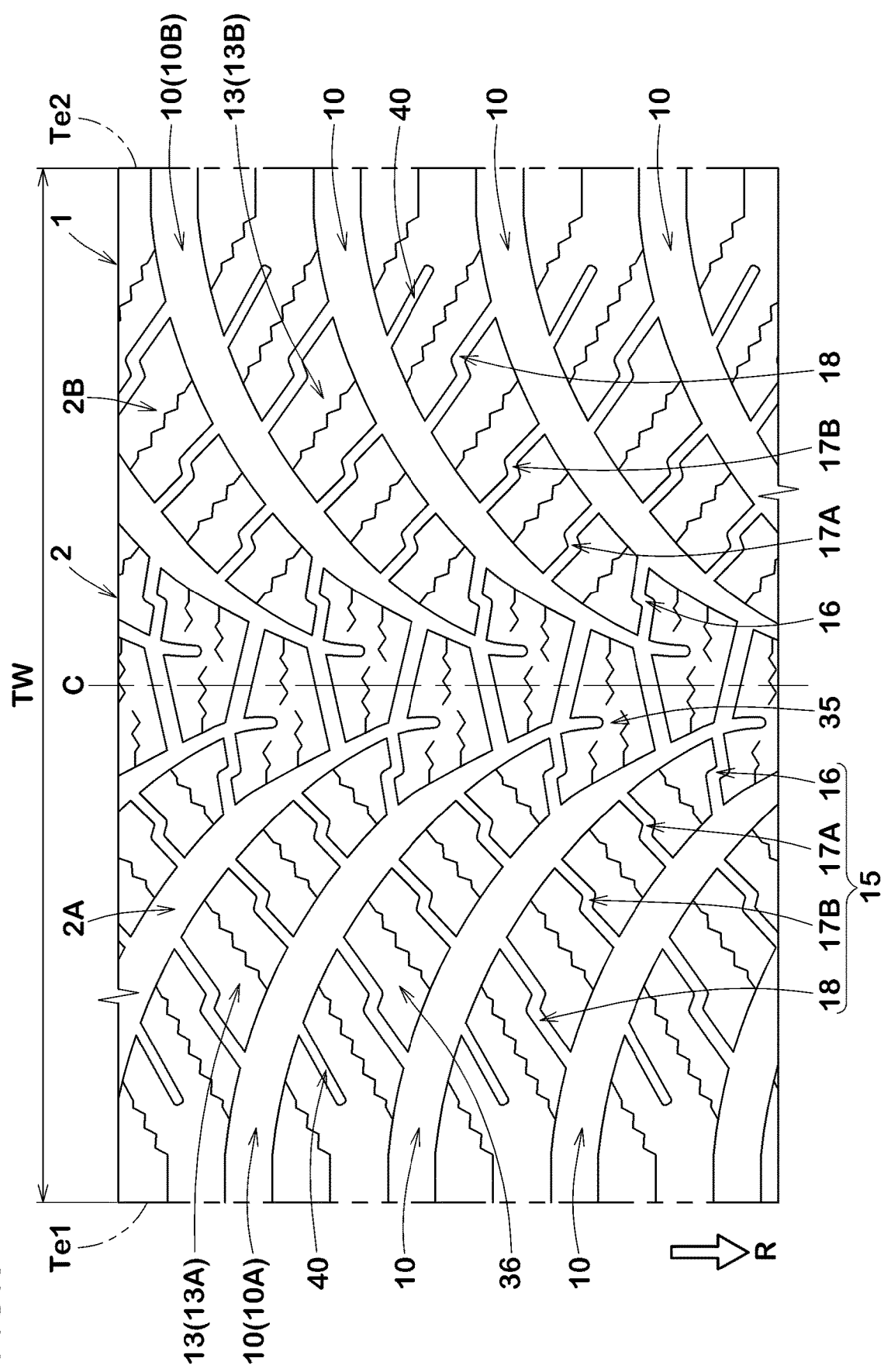
FIG. 9 is a development view of the tread portion of a tire according to third embodiment of the present invention.

FIGS. 8 and 9 respectively show a development view of the tread portion 2 of the tire 1 according to second and third embodiments of the present invention. In FIGS. 8 and 9, the same reference numerals are given to elements common to the above-described embodiment (first embodiment), and the explanation thereof is omitted.

In the second embodiment shown in FIG. 8, each of the joint grooves 15 extends straight. In such an embodiment, each of the joint grooves 15 exerts excellent drainage performance, therefore, it is possible to exert excellent performance on a road surface covered with mixture of snow and water, for example.

In the third embodiment shown in FIG. 9, not only the middle joint grooves 17 but also the inner joint grooves 16 and the outer joint grooves 18 each have two bent portions convex in opposite directions to each other. The inner joint grooves 16 and the outer joint grooves 18 configured as such are useful for forming hard snow blocks, therefore, the on-ice/on-snow performance is improved.

While detailed description has been made of embodiments of the present invention, the present invention can be embodied in various forms without being limited to the illustrated embodiments.

Working Example

Figure 10:
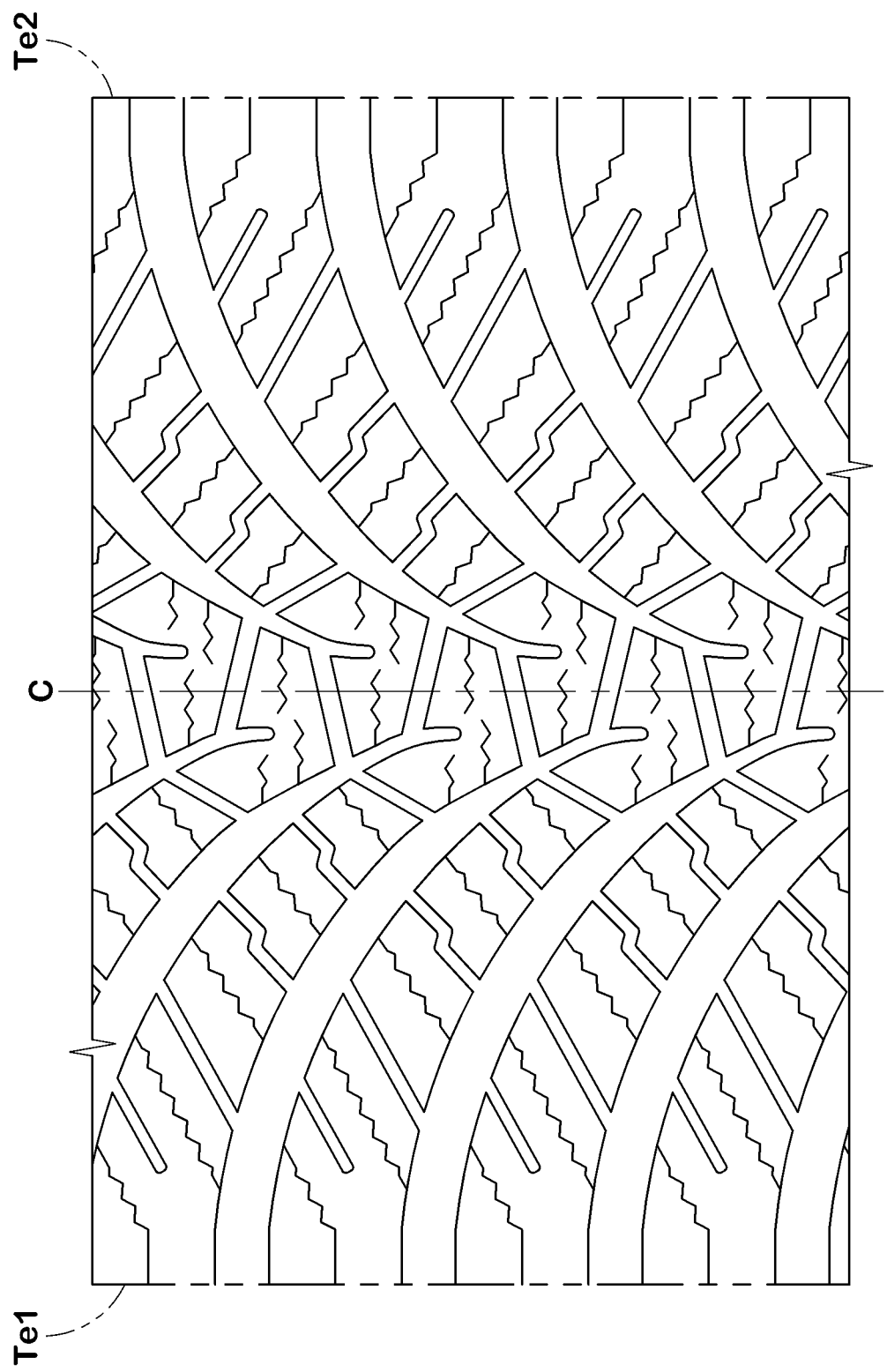
FIG. 10 is a development view of the tread portion of a tire as Reference 1.

Tires of size 205/55R16 having the basic structure shown in FIG. 1 were made by way of test according to the specification listed in Table 1. As Reference 1, as shown in FIG. 10, a tire was made by way of test in which the inner joint grooves are configured so as to have a smaller angle than the middle joint grooves with respect to the tire circumferential direction. Each of the test tires was tested for the steering stability on a dry road surface and on-snow performance. Common specifications of the test tires and the test methods are as follows.

Tread ground contacting width: 160 mm

Groove depth of oblique groove: 8.6 mm

Land ratio: 70%

Rubber hardness Ht of tread rubber: 65

Tire rim: 16×6.5

Tire inner pressure: 200 kPa

Test car: front wheel drive car with a displacement of 2000 cc

Test tire mounting position: all wheels

<Steering Stability on a Dry Road Surface>

While a driver was driving the test car on a dry road surface of a circuit course, the steering stability was evaluated by the driver's feeling. The results are indicated by an evaluation point based on Reference 1 being 100, wherein the larger the numerical value, the better the steering stability on a dry road surface is.

<On-Snow Performance>

While the driver was driving the test car on a snowy road surface, running performance was evaluated by the driver's feeling. The results are indicated by an evaluation point based on Reference 1 being 100, wherein the larger the numerical value, the better the on-snow performance is.

The test results are shown in Table 1.

TABLE 1

|  | Ref. 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Figure showing tread pattern | FIG. 10 | FIG. 1 | FIG. 1 | FIG. 1 | FIG. 1 | FIG. 1 | FIG. 1 | FIG. 1 | FIG. 1 |
| Angle θ3 of Inner joint groove [degree] | 35 | 90 | 80 | 70 | 90 | 90 | 90 | 90 | 90 |
| Angle θ4 of First middle joint groove [degree] | 55 | 55 | 55 | 55 | 50 | 60 | 65 | 55 | 55 |
| Angle θ7 of Outer joint groove [degree] | 60 | 60 | 60 | 60 | 60 | 60 | 60 | 55 | 65 |
| Angle θ8 of First straight line [degree] | 15 | 15 | 15 | 15 | 15 | 15 | 15 | 15 | 15 |
| Angle θ9 of Second straight line [degree] | 42 | 42 | 42 | 42 | 42 | 42 | 42 | 42 | 42 |
| Angle θ10 of Third straight line [degree] | 61 | 61 | 61 | 61 | 61 | 61 | 61 | 61 | 61 |
| First distance L6/Tread width TW | 0.26 | 0.26 | 0.26 | 0.26 | 0.26 | 0.26 | 0.26 | 0.26 | 0.26 |
| Second distance L7/Tread width TW | 0.13 | 0.13 | 0.13 | 0.13 | 0.13 | 0.13 | 0.13 | 0.13 | 0.13 |
| Third distance L8/Tread width TW | 0.16 | 0.16 | 0.16 | 0.16 | 0.16 | 0.16 | 0.16 | 0.16 | 0.16 |
| Steering stability on dry road surface [evaluation point] | 100 | 103 | 103 | 103 | 103 | 103 | 101 | 103 | 102 |
| On-snow performance [evaluation point] | 100 | 105 | 105 | 104 | 104 | 105 | 105 | 104 | 105 |

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| Figure showing tread pattern | FIG. 1 | FIG. 1 | FIG. 1 | FIG. 1 | FIG. 1 | FIG. 1 | FIG. 1 | FIG. 1 |
| Angle θ3 of Inner joint groove [degree] | 90 | 90 | 90 | 90 | 90 | 90 | 90 | 90 |
| Angle θ4 of First middle joint groove [degree] | 55 | 55 | 55 | 55 | 55 | 55 | 55 | 55 |
| Angle θ7 of Outer joint groove [degree] | 60 | 60 | 60 | 60 | 60 | 60 | 60 | 60 |
| Angle θ8 of First straight line [degree] | 7 | 25 | 15 | 15 | 24 | 5 | 27 | 15 |
| Angle θ9 of Second straight line [degree] | 33 | 51 | 42 | 42 | 44 | 32 | 54 | 42 |
| Angle θ10 of Third straight line [degree] | 52 | 66 | 61 | 61 | 57 | 50 | 73 | 61 |
| First distance L6/Tread width TW | 0.26 | 0.26 | 0.24 | 0.28 | 0.26 | 0.26 | 0.26 | 0.30 |
| Second distance L7/Tread width TW | 0.13 | 0.13 | 0.15 | 0.11 | 0.13 | 0.13 | 0.13 | 0.13 |
| Third distance L8/Tread width TW | 0.16 | 0.16 | 0.16 | 0.16 | 0.16 | 0.16 | 0.16 | 0.14 |
| Steering stability on dry road surface [evaluation point] | 103 | 101 | 102 | 102 | 101 | 102 | 100 | 101 |
| On-snow performance [evaluation point] | 103 | 105 | 103 | 103 | 105 | 102 | 104 | 102 |

From the test results, it was confirmed that the pneumatic tires as Examples 1 to 16 exerted excellent on-snow performance while maintaining the steering stability on a dry road surface.

Figure 11:
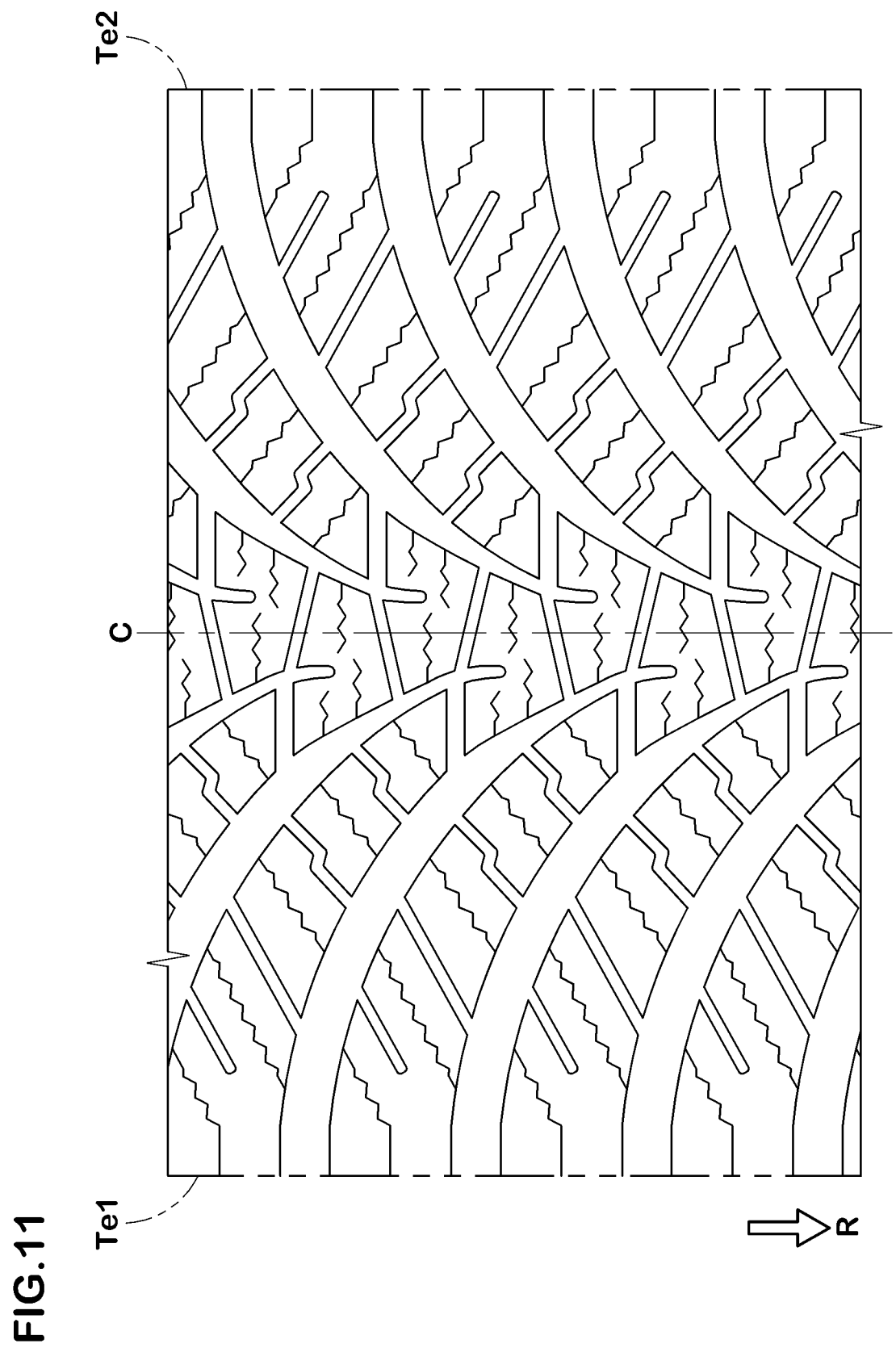
FIG. 11 is a development view of the tread portion of a tire as Reference 2.

Tires of size 205/55R16 having the basic structure shown in FIG. 1 were made by way of test according to the specification listed in Table 1. As Reference 2, as shown in FIG. 11, a tire was made by way of test in which the groove width of each of the center lateral grooves is smaller than the groove width of each of the inner joint grooves. Each of the test tires was tested for the steering stability on a dry road surface and the on-ice/on-snow performance. Common specifications of the test tires and the test methods are as follows.

Tread ground contacting width: 160 mm
Groove depth of oblique groove: 8.5 mm
Land ratio: 70%
Rubber hardness Ht of tread rubber: 65
Tire rim: 16×6.5
Tire inner pressure: 200 kPa
Test car: front wheel drive car with a displacement of 2000 cc
Test tire mounting position: all wheels <Steering Stability on a Dry Road Surface>

While the driver was driving the test car on a dry road surface of a circuit course, the steering stability was evaluated by the driver's feeling. The results are indicated by an evaluation point based on Reference 2 being 100, wherein the larger the numerical value, the better the steering stability on a dry road surface is.

<On-Ice/On-Snow Performance>

While the driver was driving the test car on an icy/snowy road surface, running performance was evaluated by the driver's feeling. The results are indicated by an evaluation point based on Reference 2 being 100, wherein the larger the numerical value, the better the on-ice/on-snow performance is.

The test results are shown in Table 2.

TABLE 2

|  | Ref. 2 | Ex. 17 | Ex. 18 | Ex. 19 | Ex. 20 | Ex. 21 | Ex. 22 | Ex. 23 | Ex. 24 |
|---|---|---|---|---|---|---|---|---|---|
| Figure showing tread pattern | FIG. 11 | FIG. 1 | FIG. 1 | FIG. 1 | FIG. 1 | FIG. 1 | FIG. 1 | FIG. 1 | FIG. 1 |
| Groove width W3 of center lateral groove [mm] | 3.6 | 5.3 | 5.3 | 5.3 | 5.3 | 5.3 | 5.3 | 5.3 | 5.3 |

TABLE 2-continued

|  | Ref. 2 | Ex. 17 | Ex. 18 | Ex. 19 | Ex. 20 | Ex. 21 | Ex. 22 | Ex. 23 | Ex. 24 |
|---|---|---|---|---|---|---|---|---|---|
| Groove width W4 of Inner joint groove [mm] | 5.3 | 3.6 | 4.1 | 3.8 | 3.3 | 3.1 | 3.6 | 3.6 | 3.6 |
| Groove width W3 of center lateral groove/Groove width W4 of Inner joint groove | 0.68 | 1.47 | 1.29 | 1.39 | 1.61 | 1.71 | 1.47 | 1.47 | 1.47 |
| Angle θ2 of center lateral groove [degree] | 15 | 15 | 15 | 15 | 15 | 15 | 20 | 25 | 10 |
| Angle θ11 of Inner joint groove [degree] | 0 | 0 | 0 | 0 | 0 | 0 | 0 | 0 | 15 |
| Steering stability on dry road surface [evaluation point] | 100 | 105 | 103 | 104 | 105 | 106 | 105 | 105 | 105 |
| On-snow performance [evaluation point] | 100 | 106 | 106 | 106 | 104 | 103 | 105 | 104 | 104 |

From the test results, it was confirmed that the pneumatic tires as Examples 17 to 24 exerted excellent on-ice/on-snow performance and excellent steering stability on a dry road surface.

Figure 12:
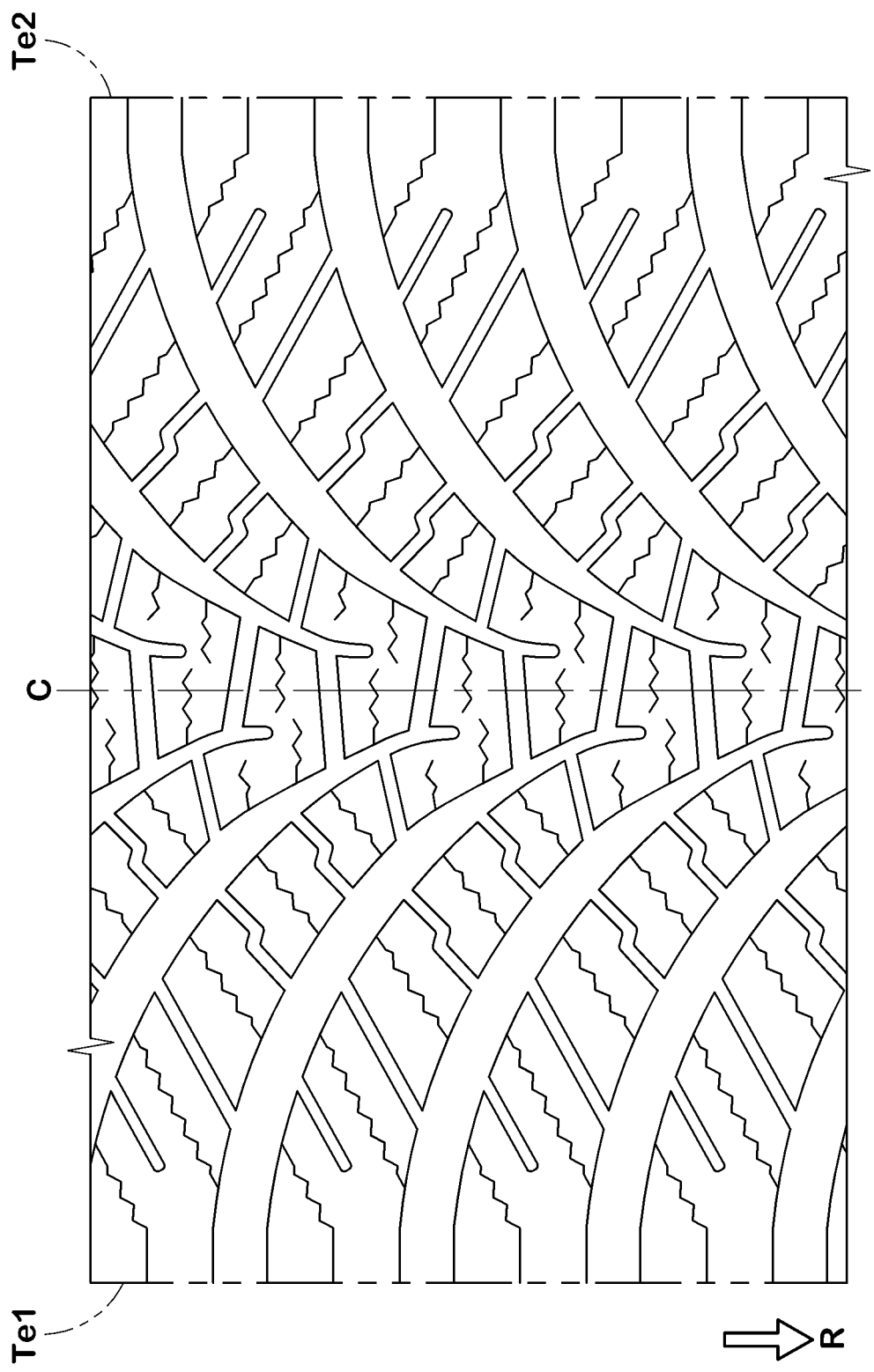
FIG. 12 is a development view of the tread portion of a tire as Reference 3.

Tires of size 205/55R16 having the basic structure shown in FIG. 1 were made by way of test according to the specification listed in Table 1. As Reference 3, as shown in FIG. 12, a tire was made by way of test in which the center lateral grooves and the inner joint grooves are not connected. Each of the test tires was tested for on-snow traction performance and the steering stability on a dry road surface. Common specifications of the test tires and the test methods are as follows.

Tread ground contacting width: 160 mm
Groove depth of oblique groove: 8.5 mm
Land ratio: 70%
Rubber hardness Ht of tread rubber: 66
Tire rim: 16×6.5
Tire inner pressure: 200 kPa
Test car: front wheel drive car with a displacement of 2000 cc
Test tire mounting position: all wheels <On-Snow Traction Performance>

While the driver was driving the test car on a snowy road surface, traction performance was evaluated by the driver's feeling. The results are indicated by an evaluation point based on Reference 3 being 100, wherein the larger the numerical value, the better the on-snow traction performance is.

<Steering Stability on a Dry Road Surface>

While the driver was driving the test car on a dry road surface of a circuit course, the steering stability was evaluated by the driver's feeling. The results are indicated by an evaluation point based on Reference 3 being 100, wherein the larger the numerical value, the better the steering stability on a dry road surface is.

The test results are shown in Table 3.

TABLE 3

|  | Ref. 3 | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|---|
| Figure showing tread pattern | FIG. 12 | FIG. 1 | FIG. 1 | FIG. 1 | FIG. 1 | FIG. 1 | FIG. 1 | FIG. 1 | FIG. 1 | FIG. 1 |
| Groove width W3 of center lateral groove/Groove width W4 of Inner joint groove | 1.50 | 1.50 | 1.30 | 1.40 | 1.60 | 1.70 | 1.50 | 1.50 | 1.50 | 1.50 |
| Length L9 of center lateral groove/Length L10 of Inner joint groove | 1.33 | 1.28 | 1.28 | 1.28 | 1.28 | 1.28 | 1.10 | 1.20 | 1.40 | 1.50 |
| On-snow traction performance [evaluation point] | 100 | 107 | 104 | 106 | 107 | 107 | 104 | 105 | 107 | 107 |
| Steering stability on dry road surface [evaluation point] | 100 | 102 | 103 | 102 | 102 | 100 | 103 | 103 | 102 | 101 |

From the test results, it was confirmed that the pneumatic tires as Examples 25 to 33 exerted excellent on-snow traction performance. Further, it was confirmed that the steering stability on a dry road surface was also maintained for the tires as Examples.

Figure 13:
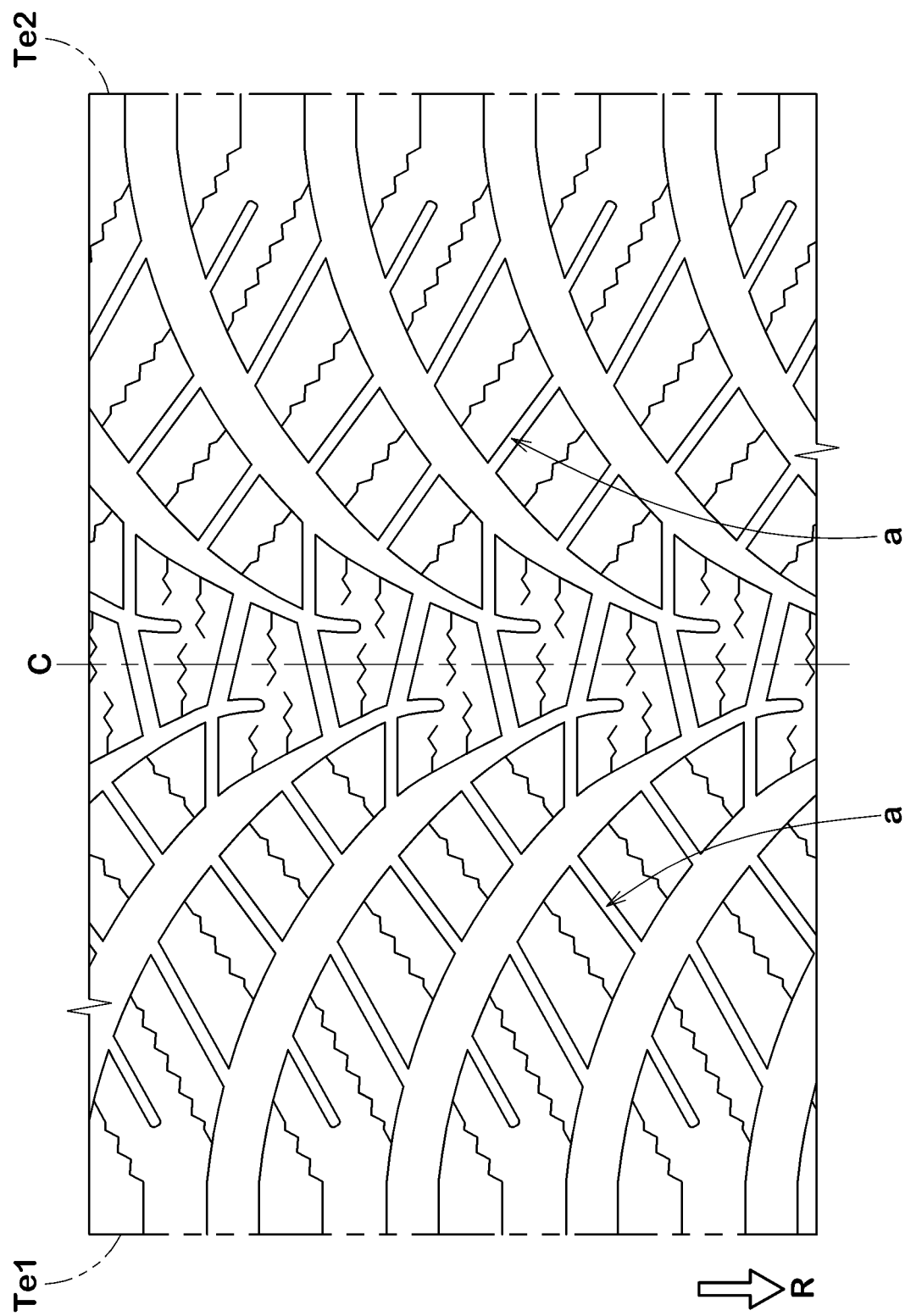
FIG. 13 is a development view of the tread portion of a tire as Reference 4.

Tires of size 205/55R16 having the basic structure shown in FIG. 1 were made by way of test according to the specification listed in Table 1. As Reference 4, as shown in FIG. 13, a tire was made by way of test in which each of the joint grooves extends straight and does not include the bent portions. Each of the test tires was tested for the on-snow traction performance and the steering stability on a dry road surface. Common specifications of the test tires and the test methods are as follows.

Tread ground contacting width: 160 mm
Groove depth of oblique groove: 8.5 mm
Land ratio: 70%
Rubber hardness Ht of tread rubber: 66
Tire rim: 16×6.5
Tire inner pressure: 200 kPa
Test car: front wheel drive car with a displacement of 2000 cc
Test tire mounting position: all wheels <On-Snow Traction Performance>

While the driver was driving the test car on a snowy road surface, traction performance was evaluated by the driver's feeling. The results are indicated by an evaluation point based on Reference 4 being 100, wherein the larger the numerical value, the better the on-snow traction performance is.

<Steering Stability on Dry Road Surface>

While the Driver was Driving the Test Car on a Dry Road surface of a circuit course, the steering stability was evaluated by the driver's feeling. The results are indicated by an evaluation point based on Reference 4 being 100, wherein the larger the numerical value, the better the steering stability on a dry road surface is.

The test results are shown in Table 4.

TABLE 4

|  | Ref. 4 | Ex. 34 | Ex. 35 | Ex. 36 | Ex. 37 | Ex. 38 | Ex. 39 | Ex. 40 | Ex. 41 | Ex. 42 |
|---|---|---|---|---|---|---|---|---|---|---|
| Figure showing tread pattern | FIG. 13 | FIG. 1 | FIG. 1 | FIG. 1 | FIG. 1 | FIG. 1 | FIG. 1 | FIG. 1 | FIG. 1 | FIG. 1 |
| Length L13 of Sub oblique portion/Length L12 of Main oblique portion | — | 0.40 | 0.30 | 0.35 | 0.45 | 0.50 | 0.40 | 0.40 | 0.40 | 0.40 |
| Angle θ5 of Main oblique portion [degree] | — | 50 | 50 | 50 | 50 | 50 | 45 | 50 | 55 | 55 |
| Angle θ6 of Sub oblique portion [degree] | — | 75 | 75 | 75 | 75 | 75 | 65 | 70 | 75 | 80 |
| On-snow traction performance [evaluation point] | 100 | 106 | 104 | 106 | 106 | 106 | 104 | 105 | 106 | 107 |
| Steering stability on dry road surface [evaluation point] | 100 | 100 | 100 | 100 | 100 | 98 | 100 | 100 | 100 | 99 |

From the test results, it was confirmed that the pneumatic tires as Examples 34 to 42 exerted excellent on-snow performance. Further, it was confirmed that the steering stability on a dry road surface was also maintained for the tires as Examples.

The invention claimed is:

1. A tire comprising:
a tread portion comprising
a plurality of oblique grooves extending obliquely from a first tread edge positioned on one side in a tire axial direction toward a tire equator and terminating without crossing the tire equator, and
a plurality of oblique land regions each defined between a pair of the oblique grooves adjacent to each other in a tire circumferential direction, wherein
each of the oblique land regions is provided with a plurality of joint grooves each connecting between the pair of the oblique grooves, wherein
the joint grooves include
an inner joint groove arranged closest to the tire equator,
two middle joint grooves arranged adjacently to the inner joint groove on the first tread edge side, and
an outer joint groove arranged closest to the first tread edge in addition to the middle joint grooves, wherein
the middle joint grooves have a smaller angle than that of the inner joint groove with respect to the tire circumferential direction,
the outer joint groove has a larger angle than that of the middle joint grooves with respect to the tire circumferential direction, and
the outer joint groove has a smaller angle than that of the inner joint groove with respect to the tire circumferential direction, wherein
the tread portion is provided with a plurality of center lateral grooves each crossing the tire equator so as to connect between a pair of the oblique grooves adjacent to each other in the tire axial direction,
the center lateral grooves have larger groove widths than the joint grooves,
the inner joint groove is connected with one of the center lateral grooves with one of the oblique grooves therebetween such that an end of the inner joint groove and an end of one of the plurality of center lateral grooves are located in a same position as with each other in a longitudinal direction of the one of the oblique grooves, and
the middle joint groove has grooves each has two bent portions that are convex in opposite directions to each other.

2. The tire according to claim 1 wherein
the at least one middle joint groove and the outer joint groove are inclined in a direction opposite to the oblique grooves.

3. The tire according to claim 1, wherein
an outer lateral groove is provided between the outer joint groove and the first tread edge, and
the outer lateral groove extends from one of the pair of the oblique grooves and terminates within the oblique land region without reaching the other one of the pair of the oblique grooves.

4. The tire according to claim 1, wherein
each of the center lateral grooves has a larger groove width over an entire length thereof than a maximum groove width of the inner joint groove.

5. The tire according to claim 4, wherein
an angle of the inner joint groove with respect to the tire axial direction is smaller than an angle of each of the center lateral grooves with respect to the tire axial direction.

6. The tire according to claim 5, wherein
a difference between the angle of each of the center lateral grooves with respect to the tire axial direction and the angle of the inner joint groove with respect to the tire axial direction is not more than 20 degrees.

7. The tire according to claim 1, wherein
the center lateral grooves extend straight.

8. The tire according to claim 1, wherein
the center lateral grooves have greater lengths in the tire axial direction than the joint grooves.

9. The tire according to claim 1, wherein
the middle joint grooves each has a pair of main oblique portions inclined in the same direction and a sub oblique portion forming the bent portions therebetween,
an angle of the pair of main oblique portions is in a range of 45 to 55 degrees with respect to the tire circumferential direction, and
an angle of the sub oblique portion is in a range of 65 to 85 degrees with respect to the tire circumferential direction.

10. The tire according to claim 1, wherein
the middle joint grooves each has a pair of main oblique portions inclined in the same direction and a sub oblique portion forming the bent portions therebetween, and
an angle of the sub oblique portion with respect to the tire circumferential direction is larger than angles of the main oblique portions with respect to the tire circumferential direction.

11. A tire comprising:
a tread portion comprising
a plurality of first oblique grooves extending obliquely from a first tread edge positioned on one side in a tire axial direction toward a tire equator and terminating without crossing the tire equator,
a plurality of second oblique grooves extending obliquely from a second tread edge positioned on another side in the tire axial direction toward the tire equator and terminating without crossing the tire equator, and
a plurality of oblique land regions each defined between a pair of the first oblique grooves adjacent to each other in a tire circumferential direction, wherein
each of the oblique land regions is provided with a plurality of joint grooves each connecting between the pair of the first oblique grooves, wherein
the joint grooves include
an inner joint groove arranged closest to the tire equator,
two middle joint grooves arranged adjacently to the inner joint groove on the first tread edge side, and
an outer joint groove arranged closest to the first tread edge in addition to the middle joint grooves, wherein
the tread portion is provided with a plurality of center lateral grooves each crossing the tire equator so as to connect between a pair of one of the first oblique grooves and one of the second oblique grooves adjacent to each other in the tire axial direction,
the inner joint groove is connected with one of the center lateral grooves with one of the first oblique grooves therebetween such that an end of the inner joint groove and an end of one of the plurality of center lateral grooves are located in a same position as with each other in a longitudinal direction of the one of the first oblique grooves, and
the middle joint grooves each has two bent portions that are convex in opposite directions to each other.

12. The tire according to claim 11, wherein
the outer joint groove has a smaller angle than that of the inner joint groove with respect to the tire circumferential direction.

13. The tire according to claim 11, wherein
the middle joint grooves and the outer joint groove are inclined in a direction opposite to the first oblique grooves.

14. The tire according to claim 11, wherein
an outer lateral groove is provided between the outer joint groove and the first tread edge, and
the outer lateral groove extends from one of the pair of the first oblique grooves and terminates within the oblique land region without reaching the other one of the pair of the first oblique grooves.

15. The tire according to claim 11, wherein
the center lateral grooves have larger groove widths than the joint grooves.

16. The tire according to claim 11, wherein
the middle joint grooves each have a pair of main oblique portions inclined in the same direction and a sub oblique portion forming the bent portions therebetween,
an angle of the pair of main oblique portions is in a range of 45 to 55 degrees with respect to the tire circumferential direction, and
an angle of the sub oblique portion is in a range of 65 to 85 degrees with respect to the tire circumferential direction.

* * * * *